US006627242B1

(12) United States Patent
McPherson et al.

(10) Patent No.: US 6,627,242 B1
(45) Date of Patent: Sep. 30, 2003

(54) MICROWAVEABLE PIZZA CRUST

(75) Inventors: Andrew E. McPherson, Mt. Prospect, IL (US); Weizhi Chen, Northfield, IL (US); Ahmad Akashe, Mundelein, IL (US); Miranda Miller, Arlington Heights, IL (US)

(73) Assignee: Kraft Foods Holdings, Inc., Northfield, IL (US)

( * ) Notice: Subject to any disclaimer, the term of this patent is extended or adjusted under 35 U.S.C. 154(b) by 0 days.

(21) Appl. No.: 09/679,484

(22) Filed: Oct. 4, 2000

(51) Int. Cl.[7] ............................................... A21D 10/02
(52) U.S. Cl. .................. 426/549; 426/94; 426/237; 426/241; 426/243; 426/275; 426/496; 426/553
(58) Field of Search .................... 426/94, 275, 496, 426/549, 237, 553, 241, 243

(56) References Cited

U.S. PATENT DOCUMENTS

| | | | |
|---|---|---|---|
| 3,637,774 A | | 1/1972 | Babayan et al. |
| 3,975,552 A | * | 8/1976 | Stangroom .................. 426/243 |
| 4,560,559 A | * | 12/1985 | Ottenberg .................... 426/19 |
| 5,035,904 A | * | 7/1991 | Huang et al. ................ 426/243 |
| 5,202,138 A | * | 4/1993 | Stypula ........................ 426/94 |
| 5,565,557 A | | 10/1996 | Koyama et al. |
| 5,620,734 A | * | 4/1997 | Wesdrop et al. ............. 426/601 |
| 5,939,128 A | * | 8/1999 | Kleinherenbrink et al. . 426/602 |
| 6,025,006 A | | 2/2000 | Miller et al. |
| 6,068,876 A | | 5/2000 | Miller et al. |
| 6,156,356 A | * | 12/2000 | King et al. .................... 426/94 |
| 6,245,374 B1 | * | 6/2001 | Thomas et al. .............. 426/549 |

* cited by examiner

*Primary Examiner*—Lien Tran
(74) *Attorney, Agent, or Firm*—Fitch, Even, Tabin, & Flannery

(57) ABSTRACT

Microwaveable pizza crusts, which when heated in a microwave oven, rise in a manner similar to conventionally-baked pizza crusts. Such pizza crusts are mesophase gel-containing. Moreover, such mesophase-containing pizza crusts, when microwaved, do not only rise as is observed with conventional pizza crusts, but microwave treatment of these pizza crusts results in highly palatable and crisp pizza crusts, similar to those that are conventionally prepared. The mesophase gels formed herein for use in pizza crust are highly viscous, even in the absence of polymeric protein or polysaccharide thickening or bulking agents. The mesophase gel is formed using at least two emulsifiers and an aqueous phase. The addition of the mesophase gel to the other pizza crust components results in a leavening action, and contributes to the palatability and firmness of the resulting pizza crust.

19 Claims, No Drawings

MICROWAVEABLE PIZZA CRUST

FIELD OF THE INVENTION

The present invention relates generally to pizza crusts which can be cooked in a microwave oven in a satisfactory manner. More particularly, the present invention relates to a mesophase-containing pizza crust which rises and forms a palatable, firm crust when prepared in a microwave oven.

BACKGROUND OF THE INVENTION

Frozen pizza is a large portion (about 7 to about 8 percent) of the $27 billion pizza market in the United States. Generally, oven-rising pizzas are limited to those for use in a conventional oven. Microwaved cereal products such as pizza crusts, cakes, and breads are generally not pleasing to the palate. Frozen microwaveable pizzas generally have either pre-baked or par-baked crusts and use susceptors (i.e., crisping-enhancing products embedded in the packaging of a microwaveable product). Microwaveable pizza presents a number of technical hurdles that are hard to overcome. For example, in microwave cooking of cereal products it is difficult to generate a crisp and brown outer crust. Moreover, microwave heating is generally uneven and, therefore, promotes the rapid onset of staleness and toughness in cereal products. It is for these reasons that susceptors are often required in the packaging of microwave cereal products. However, even use of susceptors can lead to uneven heating and/or uneven crisping of cereal products such as pizza crust.

In order to rise properly, pizza crust must generally contain a substantial amount of trapped air or gas. Such trapped air or gas is introduced in conventional breads and pizza crust through the use of yeast or chemical leavening agents. The amount of aeration of such bread-like products such as pizza crust is normally described by the term "overrun." Overrun is the relationship of the volume of the aerated food product to that of the unaerated food product and can be calculated with the following formula:

Overrun =(Aerated Volume–Initial Volume)×100 Initial Volume

Thus, an overrun of 100 indicates that the volume of the aerated food product is twice as much as the volume of the unaerated food product (i.e., an increase in volume of 100 percent).

The present invention is directed to providing a pizza crust comprising a mesophase-gel and conventional pizza crust components which, when cooked or baked in a microwave oven, rises in a manner similar to conventional oven-baked pizza crust. The present invention does not rely on conventional leavening agents, such as yeast or chemical leavening agents. Rather, a mesophase gel incorporated into the pizza dough allows the crust to rise and provides a palatable and firm crust when baked in a microwave oven. Moreover, the pizza crust remains palatable for a significant period of time (i.e., an hour or more) after baking.

The present invention provides a pizza crust composition which can be used to provide palatable pizza crust when prepared or heated in a microwave oven. This invention further provides a method for preparation of a microwaveable pizza crust which results in a pizza crust that, upon heating in a microwave oven, (1) rises, (2) is firm and palatable, and (3) remains firm and palatable for at least an hour after heating. These and other advantages of the present invention will be apparent upon a consideration of the present specification.

SUMMARY OF THE INVENTION

The present invention relates to microwaveable pizza crusts, which, when heated in a microwave oven, rise in a manner similar to conventionally-baked pizza crusts or other baked goods. The pizza crusts of the present invention contain mesophase gels. Moreover, such mesophase-gel containing pizza crusts, when microwaved, rise in a manner similar to that observed with conventional pizza crusts, and also form highly palatable and firm pizza crusts, similar to conventionally pizza crusts. Such mesophase gel-containing compositions for use in pizza crust include, mesophase-containing dispersions for use in fat-free, low-fat, and full-fat pizza crusts.

The mesophase gels formed herein for use in pizza crust are highly viscous, even in the absence of polymeric protein or polysaccharide thickening or bulking agents. The mesophase compositions described herein may be used to prepare desirable pizza crusts which have characteristics such as firmness when baked in a microwave oven. The mesophase gels have the ability to act as leavening agents in the pizza crust so that the pizza dough rises within two to four minutes after heating the crust in the microwave oven. The basic mesophase-containing compositions are more fully described in U.S. Pat. No. 6,068,876 (May 30, 2000) entitled "Mesophase-stabilized Emulsions And Dispersions For Use in Low-fat And Fat-free Food Products"; U.S. Pat. No. 6,025,006 (Feb. 15, 2000) entitled "Foam Inducing Compositions and Method for Manufacturing Thereof"; U.S. patent application Ser. No. 09/258,759, filed Feb. 26, 1999, entitled "Use of Mesophase-stabilized Compositions For Delivery of Cholesterol-reducing Sterols And Stanols in Food Products"; and copending U.S. Patent Application entitled "Microwaveable Sponge Cake," filed on the same day as this present application, all of which are owned by the present assignee and all of which are hereby incorporated by reference in their entireties.

The present invention uses a novel leavening system wherein the pizza dough rises within about 2 to about 4 minutes of microwave heating. Moreover, the present invention utilizes a unique formulation that yields desirable pizza crust texture upon microwaving, and maintains that desirable texture for a significant period after microwave cooking. Thus, the mesophase gel appears to stabilize the pizza crust so that it is relatively more palatable for a longer period after heating than conventional pizza crusts which are heated or re-heated in a microwave oven. The use of the mesophase compositions results in pizza crusts that rise in about 2 to about 4 minutes without use of any yeast or chemical leavening agent and provides acceptable product texture for at least one hour after microwave heating.

The present invention includes mesophase-containing pizza crust comprising about 0.5 to about 10.0 percent of a mesophase gel; 0 to about 25 percent maltodextrin; about 10 to about 40 percent flour; 0 to about 20 percent starch; 0 to about 10 percent fiber; 0 to about 30 percent egg product; 0 to about 10 percent oil; 0 to about 5 percent salt; and about 20 to about 40 percent water, wherein the pizza crust rises and is baked to a palatable state in a microwave oven.

Preferably the mesophase-containing pizza crust of this invention contains about 1.5 to about 4.0 percent of mesophase gel, and more preferably about 3.0 percent mesophase gel; about 21 to about 25 percent maltodextrin, and more preferably about 23 percent maltodextrin; about 16 to about 20 percent flour, and more preferably about 18 percent flour; about 11 percent to about 15 percent starch, and more preferably about 13 percent starch; about 2 to about 6 percent fiber, and more preferably about 4 percent fiber; about 1 to about 5 percent egg product, and more preferably about 3 percent egg product; 0 to about 4 percent oil, and more preferably about 2 percent oil; about 1 to about 3 percent salt, and more preferably 1 percent salt; and about 33 to about 37 percent water, and more preferably about 35 percent water.

The present invention also includes methods for making such mesophase-containing pizza crusts for use in microwave ovens. One such method comprises (a) forming an aqueous composition containing about 23 to about 27 percent maltodextrin; about 17 to about 21 percent flour; about 12 to about 16 percent starch; about 2 to about 6 percent fiber; about 1 to about 5 percent egg product; about 0.5 to about 3.5 percent salt; 0 to about 3 percent liquid oil; and about 30 to about 38 percent water, (b) mixing about 1.5 to about 4.5 percent of a mesophase gel into the aqueous composition to form a pizza dough, and (c) shaping the dough to form a microwaveable pizza crust; wherein the microwaveable pizza crust, when heated using a microwave oven, rises and forms a firm and palatable pizza crust.

DETAILED DESCRIPTION OF THE PREFERRED EMBODIMENT

The present invention relates to microwaveable pizza crusts. Such pizza crusts, when heated in a microwave oven, rise in a manner similar to conventionally-baked goods. In addition, such pizza crusts, when subjected to microwave treatment, not only rise, but result in highly palatable and firm pizza crusts, which resemble those that are conventionally prepared. Moreover, such pizza crusts maintain their palatable texture for at least about one hour after baking. The pizza crusts utilize a mesophase structure for leavening and firming characteristics of pizza dough baked in microwave ovens. The mesophase-containing pizza crusts described herein are prepared by combining a mesophase gel and conventional ingredients of pizza crust, in the absence of conventional leavening agents such as yeast or chemical leavening agents.

Although not required, conventional microwave susceptors can be used with the present microwaveable pizza crusts if desired. The use of such microwave susceptors can provide a firmer and/or criper product. Generally, however, it is preferred that microwave susceptors not be used with the present invention.

Mesophase gels formed using two or more emulsifiers can be used. Such mesophase gels have been described in U.S. Pat. No. 6,068,876 (May 30, 2000) entitled "Mesophase-Stabilized Emulsions and Dispersions For Use in Low-fat and Fat-free Food Products"; U.S. Pat. No. 6,025,006 (Feb. 15, 2000) entitled "Foam Inducing Compositions and Method for Manufacturing Thereof"; and U.S. patent application Ser. No. 09/258,759, filed Feb. 26, 1999, entitled, "Use of Mesophase-stabilized Compositions For Delivery of Cholesterol-reducing Sterols and Stanols in Food Products."

Preferably, an aqueous mesophase composition is formed using two emulsifiers or esters. Such two-emulsifier systems utilize a mixture of a first ester or a high HLB emulsifier having an HLB above about 10 and a melting point above about 37° C. and a second ester or a medium hydrophilic/lipophilic balance (HLB) emulsifier selected from the group consisting of diacetyl tartaric esters of a monoglyceride, sorbitan monopalmitates, sorbitan monolaurates, and polyoxythelene stearic acid monoesters, preferably diacetyl tartaric ester of monoglyceride. For purposes of this invention, high HLB emulsifiers have HLB values greater than about 10 and preferably from about 11 to about 25, and medium HLB emulsifiers have HLB values from about 6 to about 10 and preferably from about 6 to about 9. The second ester or high HLB emulsifier can be selected from the group consisting of mono-, di-, and tri-fatty acid esters of sucrose polyglycerol fatty acid esters, polyglycerol fatty acid esters, decaglycerol monostearate, and sodium stearoyl lactylate. An aqueous mixture containing the select emulsifier system is subjected to heat in a range of about 80 to about 95° C. and high shear at a range of about 5000 to about 50,000 sec$^{-1}$. The process results in a mesophase gel which is useful in the manufacture of microwaveable pizza crust. In important embodiments of the invention, the medium HLB emulsifier is a diacetyl tartaric acid ester of monoglyceride (DATEM), and the high HLB emulsifier is sodium stearoyl lactylate or sucrose stearate.

Mixtures of emulsifiers and water can form a number of different physical structures depending on emulsifier to water ratios, types of emulsifiers (including their HLB values), amounts of emulsifiers, and process variables (e.g., temperature, shear rates, order of component additions, and the like). Such mixtures are generally opalescent dispersions referred to as liquid crystals or mesophases. Mesophase structure may be manifested in several forms such as lamellar, vesicular, cubic, and hexagonal forms, depending upon the emulsifiers used, the emulsifier to water ratios, and the process conditions used.

Preferably, the emulsifiers used to form the mesophase gels of this invention have melting points above about 37° C. Such melting points allow these emulsifiers to be added in powder form to the liquid phases in forming the mesophase. These emulsifiers should also easily crystallize upon cooling to temperatures below their melting point. With such characteristics, the lamellar nature of the mesophase dispersions and mesophase-stabilized emulsions can be stabilized upon cooling. The fatty acid groups can be modified or changed in the various emulsifiers to obtain the desired characteristics.

HLB values for illustrative emulsifiers useful in this invention are as follows: Diacetyl tartaric acid monostearate glyceride or DATEM, HLB 8; sucrose monostearate, HLB 16; decaglycerol monostearate, HLB 13; sodium stearoyl lactylate, HLB 21. It should be noted that HLB for charged residues depend on the ionic strength of the aqueous phase. Therefore, although the calculated HLB for sodium stearoyl lactylate is 21, an experimentally derived HLB would be closer to 12. The sucrose esters are mixtures of molecules with various degrees of esterification. Although the monoesters have HLB values of 16 or more, as the length of the ester group is increased, the esters become more lipophilic and the HLB value decreases. Thus, a wide range of HLB values can be obtained from 0 to 18 depending on the number and chain length of the esters. The sucrose esters most preferred for this invention are those with HLB values greater than 10.

Key considerations for the fatty acid ester substituent of the emulsifier components are melting point and crystallization. For example, emulsifiers containing typical cis unsaturated fatty acids often have very low melting points (e.g., below about 30° C.) and are generally not suitable for incorporation in mesophase gels intending to be stored under refrigeration conditions (i.e., not frozen). Such very low melting emulsifiers might disrupt the crystal packing and destroy the lamellar nature of the mesophase complexes which appear to be present in such mesophase gels unless they are handled and stored at very low temperatures. However, for some applications (e.g., frozen pizza crust) such low melting emulsifiers could, if desired, be used, and, in some cases, may even be preferred. On the other hand, trans unsaturated fatty acids have high melting points and are expected to work well under both frozen and refrigerated conditions.

The preparation of sucrose fatty acid esters useful in the present invention is described in U.S. Pat. No. 5,565,557. The preparation of polyglycerol fatty acid esters useful in the present invention is described in U.S. Pat. No. 3,637,774. Both of these patents are incorporated by reference.

The fatty acid of the diacetyl tartaric acid mono fatty acid glyceride ester (DATEM) is selected from the group consisting of saturated and unsaturated $C_6$–$C_{22}$ fatty acids. Preferred saturated fatty acids are stearic acid and palmitic acid. Preferred unsaturated fatty acids are long chain ($C_{16}$–$C_{22}$) trans unsaturated fatty acids. The fatty acid of the sucrose fatty acid and polyglycerol fatty acid esters is also selected from the group consisting of saturated and unsaturated $C_6$–$C_{22}$ fatty acids. The preferred saturated fatty acids for the sucrose fatty acid esters and polyglycerol fatty acid esters are stearic acid and palmitic acid. Preferred unsaturated fatty acids are long chain ($C_{16}$–$C_{22}$) trans unsaturated fatty acids. Key considerations in selection of fatty acids are the melting point and crystallization of the fatty acid esters. The preferred fatty acids all result in emulsifiers which have melting points above 37° C. and which easily crystallize upon cooling to temperatures below their melting point. The most preferred fatty acids for all esters are long chain ($C_{16}$–$C_{22}$) saturated fatty acids.

The mixture of emulsifiers to provide the ester vesicles or the mesophase gel contains diacetyl tartaric acid mono fatty acid glyceride ester, or DATEM, at a level of from about 25 to about 75 percent. The second ester is also present at a level of from about 25 to about 75 percent. The preferred mixture contains from about 60 to about 40 percent of each of the first ester and second ester.

Alternatively, mesophase systems prepared using three emulsifiers or esters can be used in the present invention. In such a 3-emulsifier system, the first emulsifier or ester is an emulsifier with a high HLB number, in the range from about 12 to about 25. Examples of such emulsifiers include, but are not limited to, sucrose monostearate, sodium stearoyl lactylate, sucrose monolaurate, polyoxyethylene sorbitan monopalmitate, or polyoxyethylene stearic acid monoester. Preferably the first emulsifier is sodium stearoyl lactylate. The second emulsifier or ester of this 3-emulsifier system has an intermediate HLB number ranging from about 6 to about 10. Examples of such emulsifiers include, but are not limited to, a diacetyl tartaric acid ester of monoglyceride (DATEM), sorbitan monopalmitate, sorbitan monolaurate, and polyoxyethylene stearic acid monoester. Preferably, the second emulsifier is DATEM. The third emulsifier or ester of this 3-emulsifier system has a low HLB number (i.e., in the range of about 2 to about 6). Examples of such emulsifiers include, but are not limited to, monoglyceride, glycerol monostearate, sucrose distearate, sorbitan monostearate, glycerol monolaurate, and ethylene glycol monostearate. Preferably, the third emulsifier is monoglyceride.

To prepare the aqueous compositions of the invention, whether based on a 2- or 3-emulsifier system, it is important to provide a well blended homogeneous mixture of the dry powdered emulsifiers or esters prior to dispersing the emulsifiers or esters in water. If necessary, when the ester is not a dry powder at ambient temperature, the ester may be frozen and ground to a powder while frozen. Adding the emulsifiers individually to the water phase generally does not form the desired aqueous gel. The mixture of esters are present in the water at a level of from about 2 to about 20 percent. The dispersion is stirred with a suitable mixer (e.g., propeller mixer) while heating to a temperature of from about 80 to about 95° C. over a period of from about 10 to about 30 minutes. The heated dispersion is then cooled to about 55 to about 65° C. within 30 minutes while stirring. The mixture can then be permitted to cool to ambient temperature without stirring. For small batches (i.e., generally less than about 1000 grams), stirring can be discontinued as soon as it reaches the desired elevated temperature. For larger batches, it is generally preferred that stirring is essentially continuous. At the elevated temperature, the composition is a white milky fluid which gels upon cooling. The mixture of emulsifiers forms a complex in the form of multilamellar vesicles upon cooling to refrigeration temperatures. This complex is the mesophase gel. The ester vesicles are dispersed as a matrix in the aqueous medium. The vesicles, which form the mesophase lamellar matrix, generally range in size from about 1 micron to about 20 microns.

The mesophase gel can also be used to prepare very stable foams having a high overrun of from about 200 to about 1200. The foams are especially suitable for forming microwaveable pizza crusts. The foams are stable enough to be frozen and thawed without undergoing syneresis. The foams can be used as is or can be combined with other food products to provide an aerated food product. The microwaveable pizza crust is a suitable food product for incorporation of the mesophase gel or mesophase foams as described herein, because the foaming aspect of the composition gives aeration to the resulting pizza crust.

The foams are prepared by diluting the aqueous gel, if necessary, with additional water to provide a foam base having from about 1 to about 5 percent ester mixture. The foam base is then whipped with a suitable mixer (e.g., a Hobart™ food mixer provided with a wire whip) until the desired level of overrun is obtained. When very low levels of the ester mixture (i.e., from about 1 to about 3 percent) are present in the foam base, it is desirable to provide a bulking agent in the foam base. The bulking agent may be any of the commonly used food bulking agents, such as maltodextrins having a DE of from about 1 to about 20 and corn syrup solids having a DE of from about 20 to about 60. The bulking agent, if used, is generally present in the foam base at levels of from about 20 to about 40 percent.

The above-disclosed mesophase gels may be used to form the desired mesophase-containing pizza crust. Such pizza crust may be formed by forming an aqueous composition containing 0 to about 25 percent maltodextrin, about 10 to about 25 percent flour, 0 to about 20 percent starch, 0 to about 10 percent fiber, 0 to about 30 percent egg product, 0 to about 5 percent salt, 0 to about 10 percent optional liquid oil, and about 20 to about 40 percent water; mixing about 0.5 to about 10 percent of a mesophase gel (which has been mixed with 0 to about 2 percent maltodextrin) with the aqueous composition to form a mesophase-containing pizza dough. After shaping the mesophase-containing pizza dough into the desired shape, the resulting pizza crust may be cooked using a microwave oven. For normal thickness pizza crusts (i.e., about 0.3 to about 0.6 inches thick), a cooking time of about 2 to about 5 minutes is usually sufficient in a conventional microwave oven. The microwaved pizza crust rises in a manner similar to a conventionally baked pizza crust and has texture and mouthfeel similar to a conventionally baked pizza crust.

While not wishing to be limited by theory, it is believed that the foaming aspects of the mesophase gel, wherein air is trapped within the gel and/or pizza dough in the form of air bubbles, provide the ability of the mesophase-containing pizza crust to rise when cooked in a microwave oven. It is believed that the trapped air bubbles of the mesophase are trapped within the pizza dough, and upon heating in a microwave oven, cause the dough to rise to a point wherein the dough is palatable after baking. It is also believed that the mesophase-trapped air bubbles or the components of the mesophase themselves cause the pizza crust to achieve palatability and firmness upon baking in the microwave. These organoleptic properties are in contrast to conventional cereal products prepared in a microwave oven which generally have a tough and stale texture which is not palatable to the consumer.

The mesophase gel, or foam, when incorporated into the pizza crust as a fat-free dispersion, facilitates the manufacture of a fat-free pizza crust. Such a crust, when produced as described herein, is firm and highly palatable. Alternatively, a fat-free mesophase dispersion maybe combined with pizza dough components including oil, to form a low-fat or full-fat pizza crust. Again, the resulting crust is firm and highly palatable.

Except for the mesophase, conventional ingredients normally used in preparing pizza dough (except, of course, yeast or conventional leavening agents are not needed) can be used. Flavorants may be added via the mesophase; addition of flavorants to the crust via the mesophase provides homogeneous dispersion through the final product. The mesophase gel and the dough composition are mixed to form a mesophase-containing dough which is shaped to form a pizza crust. Pizza crusts of conventional and non-conventional shapes can be formed. Such conventional shape styles include, for example, deep dish, thin crust, circular pies, rectangular pies, and the like. The pizza crust is then optionally covered with toppings including, but not limited to, tomato sauce, cheese, sausage, mushrooms, green peppers, hot peppers, olives, hamburger, chicken, olive oil, pesto, tomato, pineapple, ham, Canadian bacon, and/or other conventional pizza toppings.

In furtherance of the present invention, the mesophase gel and the dry ingredients may be packaged in separate pouches, and sold to the consumer as a kit. The contents of the two pouches, along with water, may be combined and mixed, to yield the mesophase-containing pizza crust dough, to be baked in the microwave as described herein.

Other ingredients including, but not limited to, water, maltodextrin, flour, starch, fiber, egg products, salt and flavorings can be added or incorporated into the mesophase-containing gel to form a palatable pizza crust. Egg products may be used in any of the embodiments of the present invention and may comprise egg yolk, salted egg yolk, whole eggs, liquid egg product, spray-dried egg yolk, spray-dried whole egg, or any other form of egg product.

When preparing pizza crust containing oil, edible oils such as vegetable oil, olive oil, corn oil, soybean oil, canola oil, sunflower seed oil, peanut oil, sucrose fatty acid polyesters, and the like can be used. Other edible oils may also be used. A single edible oil or mixtures of such edible oils may be used.

The flour that may be used may be any edible flour, such as bleached or unbleached hard to soft white flour, whole wheat flour, soy flour, rice flour, corn flour, and the like. Other edible flours may also be used. A single edible flour or mixtures of such edible flours may be used. The fiber that may be used may be any edible fiber, such as microcrystalline cellulose, soy fiber, corn bran, resistant starch, and the like. Other edible fibers may be used. A single edible fiber or mixtures of edible fibers may be used.

The flavorings that may be used in the manufacture of the pizza crusts of the invention are any flavorings that are desirable in pizza crust, especially butter, bread, olive oil, and the like. Other flavorings or combinations of flavorings may be used.

The pizza crust of the present invention may be frozen for long term storage. Such mesophase-containing pizza crusts are stable at frozen temperatures for at least about 9 months. Frozen mesophase-containing pizza crusts may be cooked in a microwave oven as described herein. Alternatively, the mesophase-containing pizza crust is stable at refrigerated temperatures for about 2 months. Again, the pizza may be baked in a microwave oven as described herein.

The Examples that follow are intended to illustrate the invention and not to limit it. All percentages used herein are by weight, unless otherwise indicated. All patents, patent applications, and literature references cited herein are hereby incorporated by reference.

EXAMPLE 1

The mesophase gel and the pizza dough were prepared using the following components:

| Mesophase Gel Components | |
|---|---|
| diacetyl tartaric acid ester of monoglyceride | 15.0 g |
| sodium stearoyl lactylate | 15.0 g |
| water | 470.0 g |
| Aqueous Composition Components | |
| DE 4-5 maltodextrin | 70.0 g |
| soft wheat flour | 60.0 g |
| modified waxy corn starch | 45.0 g |
| Soy fiber | 17.5 g |
| dried egg white | 10.0 g |
| Soy liquid oil | 7.4 g |
| salt | 4.0 g |
| water | 102.0 g |

To form the mesophase gel, 15.0 g sodium steroyl lactylate, 15.0 g diacetyl tartaric acid ester of monoglyceride, and 470 g water are mixed and subjected to 10,000 $sec^{-1}$ shear at about 95° C. for about 15 minutes and then cooled to room temperature with agitation. The resulting mesophase gel is viscous. The mesophase gel (9.0 g) is combined with 9.0 g maltodextrin and 9.0 g water with gentle mixing to form a mesophase-maltodextrin mixture.

The pizza dough was prepared by blending dry ingredients (70.0 g DE 4-5 maltodextrin, 60.0 g soft wheat flour, 45.0 g modified waxy corn starch, 17.5 g soy fiber, 10.0 g dried egg white, 7.4 g liquid soy oil, and 4.0 g salt). The blended dry ingredients were then added to 102.0 g water and mixed until homogeneous. The mesophase-maltodextrin mixture (27 g) is then added to the pizza dough (339.4 g) and gently mixed. The resulting dough or batter can be poured into a pan to form the pizza crust, or otherwise formed to the desired pizza crust shape, and then frozen. After the crust is frozen, pizza toppings such as tomato sauce and cheese may be added.

Alternatively, a pizza crust having the consistency of conventional pizza dough (i.e., wherein the dough is worked mechanically and pressed into a pan) can be obtained by reducing the amount of liquid in the pizza dough formulation.

EXAMPLE 2

A whole wheat pizza crust is formulated using the components of Example 1 and substituting 50 percent of the soft wheat flour with whole wheat flour.

We claim:

1. A microwaveable mesophase gel-containing pizza crust comprising a pizza dough comprising about 0.5 to about 10 percent of a mesophase gel; 0 to about 25 percent maltodextrin; about 10 to about 40 percent flour; 0 to about 20 percent starch; 0 to about 10 percent fiber; 0 to about 30 percent egg product; 0 to about 5 percent salt; 0 to about 10 percent oil; and about 20 to about 40 percent water, wherein the pizza dough does not contain a conventional leavening agent, wherein the pizza dough, when cooked in a microwave oven, rises and obtains a firm crust, and wherein the mesophase gel comprises a high HLB emulsifier which has an HLB of between about 11 and about 25, a medium HLB emulsifier which has a HLB of between about 6 and about 10 and a low HLB emulsifier which has a HLB of between about 2 about 6.

2. The pizza crust of claim 1, wherein the mesophase gel comprises about 10 to 60 percent of said high HLB emulsifier about 1 to about 40 percent of said medium HLB emulsifier, and about 20 to about 60 percent of said low HLB emulsifier.

3. The pizza crust of claim 1, wherein the high HLB emulsifier is selected from the group consisting of mono-, di-, and tri-fatty acid esters of sucrose polyglycerol fatty acid esters, polyglycerol fatty acid esters, decaglycerol monostearate, and sodium stearoyl lactylate; and wherein the medium HLB emulsifier is selected from the group consisting of diacetyl tartaric acid esters of a monoglyceride, sorbitan monopalmitates, sorbitan monolaurates, and polyoxyethylene stearic acid monoesters.

4. The pizza crust of claim 3, wherein the high HLB emulsifier is selected from the group consisting of sodium steroyl lactylate, sucrose stearate, and a mixture thereof, and the medium HLB emulsifier is diacetyl tartaric acid ester of monoglyceride.

5. The pizza crust of claim 2, wherein the high HLB emulsifier is sodium stearoyl lactylate, the medium HLB emulsifier is diacetyl tartaric acid ester of a monoglyceride, and the low HLB emulsifier is monoglyceride.

6. The pizza crust of claim 1, wherein the pizza crust comprises about 1.5 to about 4.0 percent of the mesophase gel; about 21 to about 25 percent of maltodextrin; about 16 to about 20 percent flour; about 11 to about 15 percent starch; about 2 to about 6 percent fiber; about 1 to about 5 percent egg product; about 1 to about 3 percent salt; 0 to about 4 percent oil; and about 33 to about 37 percent water.

7. The pizza crust of claim 2, wherein the pizza crust comprises about 1.5 to about 4.0 percent of the mesophase gel; about 21 to about 25 percent of maltodextrin; about 16 to about 20 percent flour; about 11 to about 15 percent starch; about 2 to about 6 percent fiber; about I to about 5 percent egg product; about 1 to about 3 percent salt; 0 to about 4 percent oil; and about 33 to about 37 percent water.

8. A pizza crust made by the method comprising:

(a) forming an aqueous composition containing 0 to about 25 percent maltodextrin; 10 to about 40 percent flour; 0 to about 20 percent starch; 0 to about 10 percent fiber; 0 to about 30 percent egg product; 0 to about 5 percent salt; 0 to about 10 percent liquid oil; and about 20 to about 40 percent water;

(b) adding 0 to about 2 percent maltodextrin to a mesophase gel to form a mesophase-maltodextrin gel;

(c) adding about 0.5 to about 10 percent of the mesophase-maltodextrin gel to the aqueous composition and mixing to form a pizza dough;

(d) shaping the pizza dough to form a microwaveable pizza crust;

wherein the pizza dough does not contain a conventional leavening agent, wherein the microwaveable pizza crust, when heated in a microwave oven, rises to form a palatable pizza crust, and wherein the mesophase gel comprises a high HLB emulsifier which has an HLB of between about 11 and about 25, a medium HLB emulsifier which has an HLB of between about 6 and about 10 and a low HLB emulsifier which has an HLB of between about 2 and about 6.

9. The pizza crust of claim 8, wherein the high HLB emulsifier is selected from the group consisting of sodium steroyl lactylate, sucrose stearate, and a mixture thereof, and the medium HLB emulsifier is diacetyl tartaric acid ester of monoglyceride.

10. The pizza crust of claim 8, wherein the high HLB emulsifier is selected from the group consisting of mono-, di-, and tri-fatty acid esters of sucrose polyglycerol fatty acid esters, polyglycerol fatty acid esters, decaglycerol monostearate, and sodium stearoyl lactylate; and the medium HLB emulsifier is selected from the group consisting of diacetyl tartaric acid esters of a monoglyceride, sorbitan monopalmitates, sorbitan monolaurates, and polyoxyethylene stearic acid monoesters.

11. The pizza crust of claim 10, wherein the pizza crust comprises about 1.5 to about 4.0 percent of the mesophase gel; about 21 to about 25 percent of maltodextrin; about 16 to about 20 percent flour; about 11 to about 15 percent starch; about 2 to about 6 percent fiber; about 1 to about 5 percent dried egg white; about 1 to about 3 percent salt; 0 to about 4 percent oil; and about 33 to about 37 percent water.

12. The pizza crust of claim 8, wherein the mesophase gel comprises about 10 to 60 percent of said high HLB emulsifier, about 1 to about 40 percent of said medium HLB emulsifier, and about 20 to about 60 percent of said low HLB emulsifier.

13. The pizza crust of claim 12, wherein the high HLB emulsifier is sodium stearoyl lactylate, the medium HLB emulsifier is diacetyl tartaric acid ester of a monoglyceride, and the low HLB emulsifier is monoglyceride.

14. The pizza crust of claim 1, wherein the pizza dough comprises about 1.5 to about 4.5 percent of a mesophase gel; about 23 to about 27 percent of maltodextrin; about 17 to about 21 percent flour; about 12 to about 16 percent starch; about 2 to about 6 percent fiber; about 1 to about 5 percent egg product, about 1 to about 3 percent salt; 0 to about 3 percent oil; and about 30 to about 38 percent water.

15. The pizza crust of claim 2, wherein the pizza dough comprises about 1.5 to about 4.5 percent of a mesophase gel; about 23 to about 27 percent of maltodextrin; about 17 to about 21 percent flour; about 12 to about 16 percent starch; about 2 to about 6 percent fiber; about 1 to about 5 percent egg product; about 1 to about 3 percent salt; 0 to about 3 percent oil; and about 30 to about 38 percent water.

16. The pizza crust of claim 1, wherein the high HLB emulsifier is present from about 25 to about 75 percent and the medium HLB emulsifier is present from about 25 to about 75 percent.

17. The pizza crust of claim 1, wherein the high HLB emulsifier is present from about 40 to about 60 percent and the medium HLB emulsifier is present from about 40 to about 60 percent.

18. The pizza crust of claim 8, wherein about 0.5 to about 2 percent maltodextrin is added to the mesophase gel in step (b).

19. The microwaveable pizza crust of claim 1, wherein the mesophase gel comprises water and emulsifiers having melting points above about 37° C. wherein 0 to about 2 percent maltodextrin is optionally added to the mesophase gel prior to incorporation into the pizza crust.

* * * * *

UNITED STATES PATENT AND TRADEMARK OFFICE
CERTIFICATE OF CORRECTION

PATENT NO. : 6,627,242 B1  Page 1 of 1
DATED : September 30, 2003
INVENTOR(S) : McPherson et al.

It is certified that error appears in the above-identified patent and that said Letters Patent is hereby corrected as shown below:

Column 8,
Line 60, change "," to -- ; --.

Column 9,
Line 1, after "emulsifier", insert a -- , --.
Line 52, change "," to -- ; --.

Column 10,
Line 55, after "37°.", insert -- and --.

Signed and Sealed this

Third Day of February, 2004

JON W. DUDAS
*Acting Director of the United States Patent and Trademark Office*